(12) United States Patent
Tamura et al.

(10) Patent No.: US 11,921,542 B2
(45) Date of Patent: Mar. 5, 2024

(54) ELECTRONIC DEVICE, KEYBOARD, AND ELECTRONIC DEVICE ASSEMBLY

(71) Applicant: Huawei Technologies Co., Ltd., Shenzhen (CN)

(72) Inventors: Fumio Tamura, Yokohama (JP); Yake Zou, Dongguan (CN); Weiyong Huang, Taipei (TW); Pan He, Wuhan (CN); Ryo Otsuka, Yokohama (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/246,922

(22) PCT Filed: Sep. 7, 2021

(86) PCT No.: PCT/CN2021/116985
§ 371 (c)(1),
(2) Date: Mar. 28, 2023

(87) PCT Pub. No.: WO2022/068538
PCT Pub. Date: Apr. 7, 2022

(65) Prior Publication Data
US 2023/0359240 A1 Nov. 9, 2023

(30) Foreign Application Priority Data
Sep. 29, 2020 (CN) .......................... 202011048414.3

(51) Int. Cl.
*H01H 13/83* (2006.01)
*F21V 8/00* (2006.01)
(Continued)

(52) U.S. Cl.
CPC .......... *G06F 1/1616* (2013.01); *G06F 1/1643* (2013.01); *G06F 1/1662* (2013.01);
(Continued)

(58) Field of Classification Search
CPC .... G06F 1/1616; G06F 1/1643; G06F 1/1662; G06F 3/0233; G06F 2200/16; G06F 2203/01; H01H 13/705
See application file for complete search history.

(56) References Cited

U.S. PATENT DOCUMENTS 6,137,071 A   10/2000 Yeh et al.
2011/0042195 A1   2/2011 Tsai
(Continued)

*Primary Examiner* — Deeprose Subedi
(74) *Attorney, Agent, or Firm* — Slater Matsil, LLP

(57) ABSTRACT

An electronic device includes a keyboard. The keyboard includes a base plate and keys disposed on a base plate. The base plate includes a back support plate, a membrane, and a backlight plate. The membrane and the backlight plate are disposed on two sides of the back support plate. The back support plate supports the membrane, the backlight plate, and the keys. In addition, a buffer structure is disposed on a surface of a side that is of the backlight plate and that faces the key. The back support plate is provided with a first through hole. The key is disposed on a side that is of the membrane and that is away from the back support plate. A protrusion is disposed on a side that is of the key and that faces the base plate. The key moves toward the base plate. The protrusion can press the buffer structure.

20 Claims, 10 Drawing Sheets

(51) Int. Cl.
*G06F 1/16* (2006.01)
*G06F 3/02* (2006.01)
*G06F 3/023* (2006.01)
*H01H 13/705* (2006.01)

(52) U.S. Cl.
CPC ......... *G06F 3/0233* (2013.01); *H01H 13/705* (2013.01); *G06F 2200/16* (2013.01); *G06F 2203/01* (2013.01)

(56) References Cited

U.S. PATENT DOCUMENTS

| | | | |
|---|---|---|---|
| 2012/0312670 A1 | 12/2012 | Jhuang et al. | |
| 2015/0016039 A1* | 1/2015 | Oakley | G06F 1/1618 |
| | | | 361/679.12 |
| 2022/0044889 A1* | 2/2022 | Ho | G02B 6/0083 |

* cited by examiner

ELECTRONIC DEVICE, KEYBOARD, AND ELECTRONIC DEVICE ASSEMBLY

CROSS-REFERENCE TO RELATED APPLICATIONS

This application is a national stage of International Application No. PCT/CN2021/116985, filed on Sep. 7, 2021, which claims priority to Chinese Patent Application No. 202011048414.3, filed on Sep. 29, 2020. Both of the aforementioned applications are hereby incorporated by reference in their entireties.

TECHNICAL FIELD

This application relates to the field of electronic device technologies, and in particular, to an electronic device, a keyboard, and an electronic device assembly.

BACKGROUND

In current era, with richer daily lives of people and increasing economic and commercial activities, notebook computers become one of indispensable terminal products. As an important part of the notebook computer, a keyboard is a main input device in office and game scenarios, and a user increasingly expects various features of the keyboard.

A user who often uses a keyboard for input cares more about the experience of tapping the keyboard. As the notebook computer develops to be small and thin, a key on the keyboard has a shorter stroke. When the user taps the key, a keycap comes into contact with a base plate after a very short stroke. Consequently, the user may feel that the keycap collides with a hard object, and feel finger fatigue after using the keyboard for a long time.

Therefore, how to develop a keyboard to be light, thin, and portable and also provide a user with delicate and comfortable user experience has become a difficult problem to be urgently resolved by persons skilled in the art.

SUMMARY

This application provides an electronic device, a keyboard, and an electronic device assembly, to increase a distance between a key of the keyboard and a contact point of a base plate.

According to a first aspect, this application provides an electronic device. The electronic device includes a display and a processor assembly. The processor assembly includes a keyboard. The processor assembly includes a circuit board and the keyboard. In this way, both the display and the keyboard may be connected to the circuit, to implement signal connection between the display and the keyboard, so that the display can be used to display an input operation of the keyboard. In addition, when the keyboard is specifically disposed, the keyboard includes a base plate and keys disposed on the base plate. The base plate includes a back support plate, a membrane, and a backlight plate that are stacked. The back support plate is disposed between the membrane and the backlight plate, to support the membrane, the backlight plate, and the keys disposed on the base plate. A first buffer structure is disposed on a surface of a side that is of the backlight plate and that faces the back support plate. The first buffer structure protrudes from the surface of the backlight plate in a direction toward the key. In addition, the back support plate is provided with a first through hole. The membrane is provided with a second through hole. In a direction from the membrane to the backlight plate, a projection of the first buffer structure falls within a projection boundary range of the first through hole, and falls within a boundary range of the second through hole. The key is disposed on a side that is of the membrane and that is away from the back support plate. A switch circuit is disposed on the membrane. When being pressed, the key may connect terminals that are originally in an open-circuit state and that are in the switch circuit of the membrane, to implement an input function corresponding to the key. In addition, a first protrusion is further disposed on a side that is of the key and that faces the base plate. The first protrusion protrudes from the key in a direction toward the base plate. When the key moves toward the base plate, the first protrusion may be in press contact with a second buffer structure.

When the electronic device in this embodiment of this application is used, an input operation may be performed on the electronic device by using the keyboard. Specifically, when bearing pressing force, the key moves toward the base plate. Because the membrane of the base plate and the back support plate are provided with the through holes, a distance between the first protrusion on the key and the first buffer structure of the base plate can be effectively increased. In this way, the first protrusion on the key may pass through the second through hole in the membrane and the first through hole in the back support plate to come into contact with the first buffer structure disposed on the backlight plate, and start to decelerate to zero. In this embodiment of this application, the first through hole in the back support plate is only used to avoid the first protrusion on the key. Therefore, the first through hole may be small, so that the back support plate has reliable structural stability, and structural stability of the keyboard is higher. In addition, the first buffer structure is disposed on the backlight plate, so that the backlight plate can deform to effectively buffer the key. The backlight plate has good buffering effect, so that a user feels less fatigue when tapping the keyboard, and user experience is good.

In a possible implementation of this application, when the first buffer structure is specifically disposed, the first buffer structure may be but is not limited to a rigid structure protrusion made of ink or plastic. In this way, when the first protrusion on the key is in contact with the first buffer structure, the first buffer structure is in rigid contact with the first protrusion, so that the first buffer structure decelerates the key.

In addition, a protrusion height of the first buffer structure may be further adjusted, to adjust a height of a position at which the first protrusion on the key is in contact with the first buffer structure. This improves deceleration effect of the first buffer structure on the key. For example, a height of the first buffer structure higher than the backlight plate may be greater than or equal to a sum of thicknesses of the back support plate and the membrane.

In a possible implementation of this application, the key further includes a second protrusion. The backlight plate is further provided with the second buffer structure. The key moves toward the base plate. The second protrusion may be in press contact with the second buffer structure. In this way, multi-point contact between the base plate and the key can be implemented, so that the key more stably continues moving after each protrusion on the key comes into contact with each buffer structure. This helps improve user experience.

In addition, when the base plate is provided with both the first buffer structure and the second buffer structure, in a projection range that is of the key and that is on the base plate, the first buffer structure and the second buffer structure may be disposed in a middle area, the first buffer structure and the second buffer structure are disposed at an end, or the first buffer structure and the second buffer structure are disposed at two vertices of a diagonal line.

In a possible implementation of this application, when the backlight plate is specifically disposed, the backlight plate may be a multi-membrane layer structure. The multi-membrane layer structure may, but not limited to, be formed by stacking a plurality of flexible membrane layers. The flexible membrane may include one or more organic materials. In this way, when being pressed, the key presses the buffer structure, and a part that is of each layer structure of the backlight plate and that is located on a periphery of the buffer structure may be deformed to an extent, so that the backlight plate can more effectively buffer the key, and a user finger pressing the key bears less impact. This improves user experience.

In a possible implementation of this application, the backlight plate may include a first layer structure and a second layer structure. The first layer structure is located on a side that is of the second layer structure and that is close to the key. The first buffer structure is disposed on a surface of the first layer structure. A cavity structure may be further disposed between the first layer structure and the second layer structure. The cavity structure is disposed opposite to the first buffer structure. Specifically, in a direction from the first layer structure to the second layer structure, the projection of the first buffer structure falls within a projection boundary range of the cavity structure. In this way, when being pressed, the first layer structure of the backlight plate may move into the cavity structure, and then drive other layer structures of the backlight plate to deform, to better buffer the key. In addition, in the direction from the first layer structure to the second layer structure, a projection area of the cavity structure may be further greater than an area of the projection of the first buffer structure, to increase deformation of the backlight plate and better buffer the key.

In a possible implementation of this application, when the key is specifically disposed, the key may include a keycap and a lifting assembly. The keycap is configured to provide a pressed surface that bears pressing force. The lifting assembly is disposed between the keycap and the base plate. The lifting assembly is configured to drive the keycap to reciprocate in a direction toward or away from the base plate, and may further provide support force for the keycap at a maximum distance from the base plate.

In a possible implementation of this application, when the lifting assembly is specifically disposed, the lifting assembly may include a support and a rebound structure. The support may include a plurality of support parts arranged in a cross manner. Each support part may rotate around a support point of the support part for the keycap. In addition, a chute is further disposed on a side that is of the keycap and that faces the membrane, so that one end of the support part can extend into the chute and is slidable along the chute. When the key moves toward or away from the base plate, the support part may rotate around the support point of the support part for the keycap, and slide along the chute in the keycap.

When the key is connected to the base plate, a hook may be disposed on a side that is of the back support plate and that faces the key. An end that is of the support part and that is close to the base plate fits the hook and is rotatable around the hook.

In addition, the rebound structure is disposed between the keycap and the base plate. Two ends of the rebound structure separately abut against the membrane and the keycap. The rebound structure can provide elastic support force for the keycap to keep a maximum distance from the base plate, and can also allow the user to easily press the key.

In a possible implementation of this application, the first protrusion on the key may be a part of an original structure of the keycap, to effectively simplify a structure of the key and reduce costs of redesigning a mold of the keycap. In addition, the first protrusion may alternatively be an independent structure disposed on the keycap, so that the first protrusion can be flexibly disposed. The first protrusion is disposed on the keycap. When the user presses the keycap by a finger, buffer force borne by the first protrusion may be directly fed back to the finger of the user, and rebound force is provided for the finger of the user, so that the user feels less fatigue when tapping the key.

In another possible implementation of this application, when a lifting mechanism of the key includes a support, the first protrusion on the key may be further disposed on the support. The first protrusion may be a part of the original structure of the support, to effectively simplify the structure of the key and reduce costs of redesigning the mold of the keycap. In addition, the first protrusion may alternatively be an independent structure disposed on the support, so that the first protrusion can be flexibly disposed.

In a possible implementation of this application, the electronic device may be a notebook computer. The processor assembly of the notebook computer may further include a touch panel. The touch panel may be connected to the circuit board, to implement signal connection with the display, so that operation control is performed on the notebook computer by using the touch panel.

According to a second aspect, this application further provides a keyboard. The keyboard includes a base plate and keys disposed on the base plate. The base plate includes a back support plate, a membrane, and a backlight plate that are stacked. The back support plate is disposed between the membrane and the backlight plate, to support the membrane, the backlight plate, and the keys disposed on the base plate. A first buffer structure is disposed on a surface of a side that is of the backlight plate and that faces the back support plate. The first buffer structure protrudes from the surface of the backlight plate in a direction toward the key. In addition, the back support plate is provided with a first through hole. The membrane is provided with a second through hole. In a direction from the membrane to the backlight plate, a projection of the first buffer structure falls within a projection boundary range of the first through hole, and falls within a boundary range of the second through hole. The key is disposed on a side that is of the membrane and that is away from the back support plate. A switch circuit is disposed on the membrane. When being pressed, the key may connect terminals that are originally in an open-circuit state and that are in the switch circuit of the membrane, to implement an input function corresponding to the key. In addition, a first protrusion is further disposed on a side that is of the key and that faces the base plate. The first protrusion protrudes from the key in a direction toward the base plate. When the key moves toward the base plate, the first protrusion may be in press contact with a second buffer structure.

According to the keyboard in this embodiment of this application, when bearing pressing force, the key moves toward the base plate. Because the membrane of the base plate and the back support plate are provided with the through holes, a distance between the first protrusion on the key and the first buffer structure of the base plate can be effectively increased. In this way, the first protrusion on the key may pass through the second through hole in the membrane and the first through hole in the back support plate to come into contact with the first buffer structure disposed on the backlight plate, and start to decelerate to zero. In this embodiment of this application, the first through hole in the back support plate is only used to avoid the first protrusion on the key. Therefore, the first through hole may be small, so that the back support plate has reliable structural stability, and structural stability of the keyboard is higher. In addition, the first buffer structure is disposed on the backlight plate, so that the backlight plate can deform to effectively buffer the key. The backlight plate has good buffering effect.

In a possible implementation of this application, when the first buffer structure is specifically disposed, the first buffer structure may be but is not limited to a rigid structure protrusion made of ink or plastic. In this way, when the first protrusion on the key is in contact with the first buffer structure, the first buffer structure is in rigid contact with the first protrusion, so that the first buffer structure decelerates the key.

In addition, a protrusion height of the first buffer structure may be further adjusted, to adjust a height of a position at which the first protrusion on the key is in contact with the first buffer structure. This improves deceleration effect of the first buffer structure on the key. For example, a height of the first buffer structure higher than the backlight plate may be greater than or equal to a sum of thicknesses of the back support plate and the membrane.

In a possible implementation of this application, the key further includes a second protrusion. The backlight plate is further provided with the second buffer structure. The key moves toward the base plate. The second protrusion may be in press contact with the second buffer structure. In this way, multi-point contact between the base plate and the key can be implemented, so that the key more stably continues moving after each protrusion on the key comes into contact with each buffer structure. This helps improve user experience.

In addition, when the base plate is provided with both the first buffer structure and the second buffer structure, in a projection range that is of the key and that is on the base plate, the first buffer structure and the second buffer structure may be disposed in a middle area, the first buffer structure and the second buffer structure are disposed at an end, or the first buffer structure and the second buffer structure are disposed at two vertices of a diagonal line.

In a possible implementation of this application, when the backlight plate is specifically disposed, the backlight plate may be a multi-membrane layer structure. The multi-membrane layer structure may, but not limited to, be formed by stacking a plurality of flexible membrane layers. The flexible membrane may include one or more organic materials. In this way, when being pressed, the key presses the buffer structure, and a part that is of each layer structure of the backlight plate and that is located on a periphery of the buffer structure may be deformed to an extent, so that the backlight plate can more effectively buffer the key, and a user finger pressing the key bears less impact. This improves user experience.

In a possible implementation of this application, the backlight plate may include a first layer structure and a second layer structure. The first layer structure is located on a side that is of the second layer structure and that is close to the key. The first buffer structure is disposed on a surface of the first layer structure. A cavity structure may be further disposed between the first layer structure and the second layer structure. The cavity structure is disposed opposite to the first buffer structure. Specifically, in a direction from the first layer structure to the second layer structure, the projection of the first buffer structure falls within a projection boundary range of the cavity structure. In this way, when being pressed, the first layer structure of the backlight plate may move into the cavity structure, and then drive other layer structures of the backlight plate to deform, to better buffer the key. In addition, in the direction from the first layer structure to the second layer structure, a projection area of the cavity structure may be further greater than an area of the projection of the first buffer structure, to increase deformation of the backlight plate and better buffer the key.

In a possible implementation of this application, when the key is specifically disposed, the key may include a keycap and a lifting assembly. The keycap is configured to provide a pressed surface that bears pressing force. The lifting assembly is disposed between the keycap and the base plate. The lifting assembly is configured to drive the keycap to reciprocate in a direction toward or away from the base plate, and may further provide support force for the keycap at a maximum distance from the base plate.

In a possible implementation of this application, when the lifting assembly is specifically disposed, the lifting assembly may include a support and a rebound structure. The support may include a plurality of support parts arranged in a cross manner. Each support part may rotate around a support point of the support part for the keycap. In addition, a chute is further disposed on a side that is of the keycap and that faces the membrane, so that one end of the support part can extend into the chute and is slidable along the chute. When the key moves toward or away from the base plate, the support part may rotate around the support point of the support part for the keycap, and slide along the chute in the keycap.

When the key is connected to the base plate, a hook may be disposed on a side that is of the back support plate and that faces the key. An end that is of the support part and that is close to the base plate fits the hook and is rotatable around the hook.

In addition, the rebound structure is disposed between the keycap and the base plate. Two ends of the rebound structure separately abut against the membrane and the keycap. The rebound structure can provide elastic support force for the keycap to keep a maximum distance from the base plate, and can also allow the user to easily press the key.

In a possible implementation of this application, the first protrusion on the key may be a part of an original structure of the keycap, to effectively simplify a structure of the key and reduce costs of redesigning a mold of the keycap. In addition, the first protrusion may alternatively be an independent structure disposed on the keycap, so that the first protrusion can be flexibly disposed. The first protrusion is disposed on the keycap. When the user presses the keycap by a finger, buffer force borne by the first protrusion may be directly fed back to the finger of the user, and rebound force is provided for the finger of the user, so that the user feels less fatigue when tapping the key.

In another possible implementation of this application, when a lifting mechanism of the key includes a support, the first protrusion on the key may be further disposed on the support. The first protrusion may be a part of the original structure of the support, to effectively simplify the structure of the key and reduce costs of redesigning the mold of the keycap. In addition, the first protrusion may alternatively be an independent structure disposed on the support, so that the first protrusion can be flexibly disposed.

According to a third aspect, this application further provides an electronic device assembly. The electronic device assembly includes an electronic device. The keyboard in the second aspect may be used as an accessory to be connected to the electronic device through a communication interface. The electronic device may be, for example, a desktop computer, a tablet computer, or a mobile phone. When the electronic device is a desktop computer, the desktop computer further includes a display device and a host server. In this case, both the display device and the keyboard may be connected to the host server, to implement indirect connection between the display device and the keyboard. In addition, when the electronic device is an integrated machine such as a tablet computer or a mobile phone, the electronic device may be directly connected to the keyboard through the communication interface.

In the electronic device assembly in this embodiment of this application, the electronic device may be controlled by tapping the keyboard, so that a user feels imperceptible fatigue when tapping the keyboard. This improves user experience.

REFERENCE NUMERALS

Figure 1:
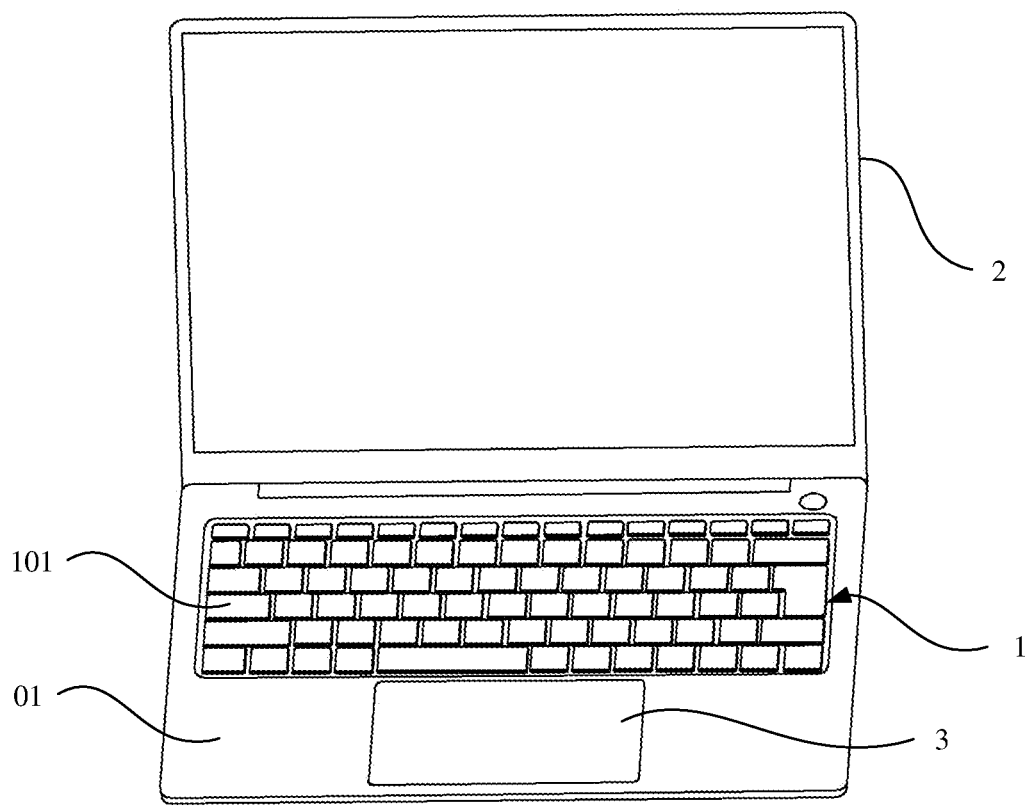
FIG. 1 is a schematic diagram of a structure of a notebook computer according to an embodiment of this application.

01—Processor assembly; 1—Keyboard; 101—Key; 1011—Protrusion; 1012—Keycap; 1013—Lifting assembly; 10131—Support; 10131a-Support part; 10132—Rebound structure; 102—Base plate; 1021—Buffer structure; 1022—Back support plate; 10221—First through hole; 10222—Hook; 1023—Membrane; 10231—Second through hole; 1024—Backlight plate; 1024a, 1024b, 1024c—Layer structure; 10241—Cavity structure;

2: Display; 3: Touch panel; 4: Electronic device.

DETAILED DESCRIPTION OF ILLUSTRATIVE EMBODIMENTS

To make the objectives, technical solutions, and advantages of this application clearer, the following further describes this application in detail with reference to the accompanying drawings.

Terms used in the following embodiments are merely intended to describe specific embodiments, but are not intended to limit this application. Terms "one", "a", "the foregoing", "the", and "the one" of singular forms used in this specification and the appended claims of this application are also intended to include plural forms like "one or more", unless otherwise specified in the context clearly.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "comprise", "include", "have", and other variants thereof all mean "include but is not limited to", unless otherwise specifically emphasized in another manner.

For ease of understanding a keyboard provided in embodiments of this application, the following first describes a specific application scenario of the keyboard. The keyboard provided in embodiments of this application may be but is not limited to a keyboard applied to a common office desktop computer, a keyboard applied to a portable notebook computer, a keyboard case of a light office tablet computer or a personal digital assistant (personal digital assistant, PDA), a small keyboard adaptive to a mobile phone, a keyboard of a calculator or a game joypad, or the like.

The keyboard is a main input device in office and game scenarios, and a user increasingly expects various features of the keyboard. The keyboard generally includes a back support plate, a membrane switch circuit disposed on the back support plate, and a plurality of keys disposed on the membrane switch circuit. Each key includes a keycap and a lifting assembly that is connected between the keycap and the membrane switch circuit. As an electronic device develops to be thin and small, the keyboard accordingly becomes thinner, and the key on the keyboard has a shorter stroke, resulting in higher difficulty in buffer design of the key. When the user taps the keyboard, the keycap and the lifting assembly are usually in contact with the membrane switch circuit and the back support plate when pressed to the bottom end. In this case, the user may feel a collision with a hard object, and feel finger fatigue after using the keyboard for a long time, resulting in poor user experience.

FIG. 1 is a schematic diagram of a structure of a notebook computer to which a keyboard 1 in an embodiment of this application is applied. In addition to the keyboard 1, the notebook computer further includes a display 2. The keyboard 1 is a part of the processor assembly 01 of the notebook computer. The display 2 is in signal connection with the keyboard 1, to display an input operation of the keyboard 1. When being connected, the display 2 and the keyboard 1 may, but not limited to, be connected through a circuit board (not shown in the figure) disposed inside the processor assembly 01, to implement signal transmission between the display 2 and the keyboard 1.

Still refer to FIG. 1. The processor assembly 01 of the notebook computer may further include a touch panel 3. The touch panel 3 may be connected to the circuit board, to implement signal connection with the display 2, so that operation control is performed on the notebook computer by using the touch panel 3.

With richer daily lives of people and increasing economic and commercial activities, the notebook computer becomes one of indispensable terminal products. A user who often uses the keyboard 1 for input, especially when using the notebook computer for business activities, may need to perform a large quantity of input operations by using the keyboard 1 all day. In recent years, when the user raises a higher requirement on a function of the notebook computer, a requirement on experience of tapping the keyboard 1 is also higher.

In addition, when a key 101 of the keyboard 1 is tapped, buffer design is a key factor in the experience of tapping the keyboard 1. The keyboard 1 provided in this embodiment of this application is intended to improve buffering effect on the key 101 when the key 101 is tapped, to improve user experience.

Figure 2:
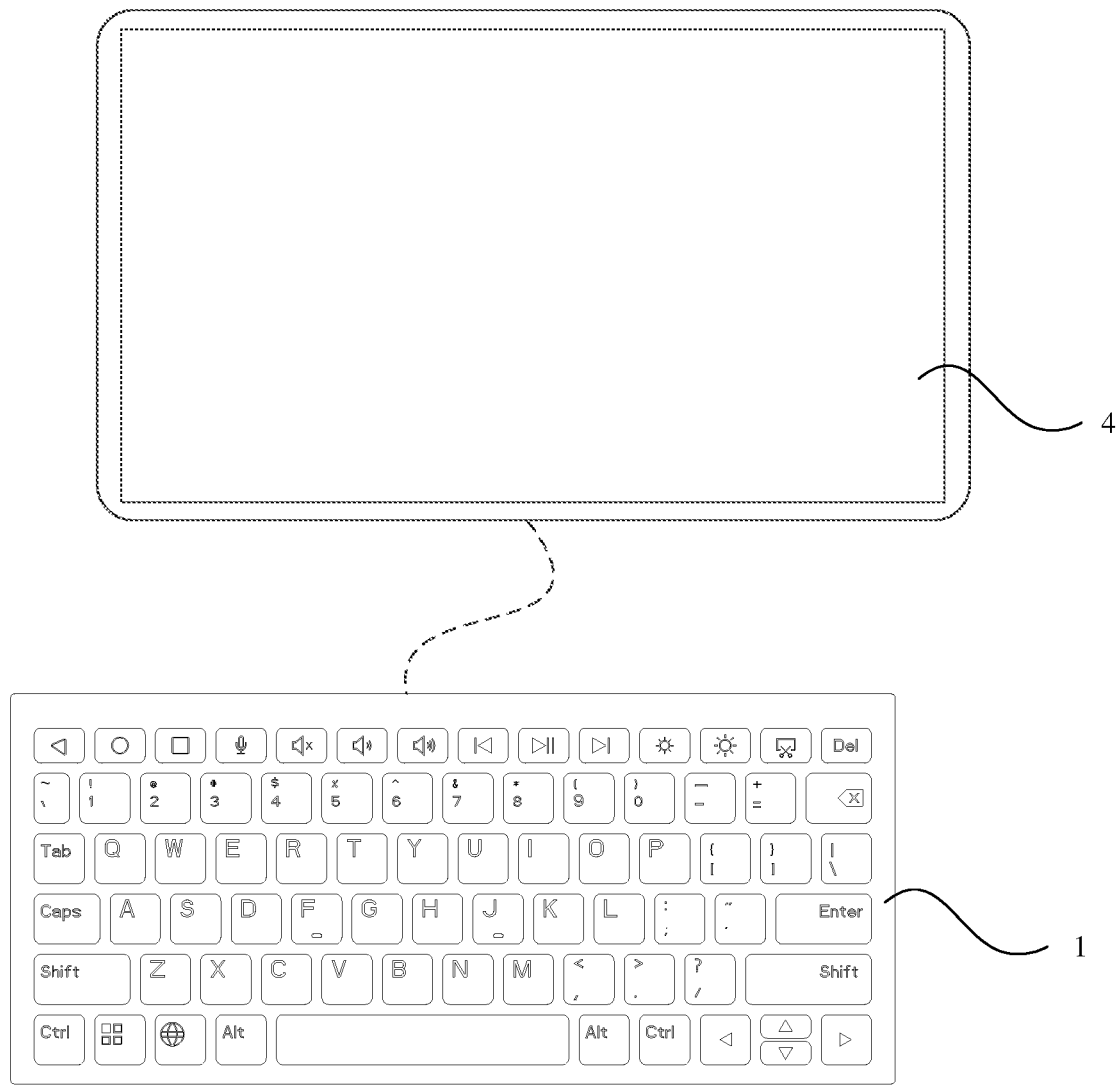
FIG. 2 is a schematic diagram of a structure of an electronic device assembly according to an embodiment of this application.

In some embodiments, the keyboard 1 in this application may alternatively be used as an accessory of an electronic device. FIG. 2 is a schematic diagram of a structure of an electronic device assembly. The electronic device assembly includes an electronic device 4 that may be configured to perform display. For example, the electronic device 4 may be a desktop computer, a tablet computer, or a PDA. The keyboard 1 provided in this application may be connected to the electronic device 4 through a communication interface, so that the electronic device 4 is controlled by tapping the keyboard 1. For example, when the electronic device is a desktop computer, the desktop computer further includes a display device and a host server. In this case, both the display device and the keyboard may be connected to the host server, to implement indirect connection between the display device and the keyboard. In addition, when the electronic device is an integrated machine such as a tablet computer or a mobile phone, the electronic device may be directly connected to the keyboard through the communication interface.

The following uses the keyboard 1 of the notebook computer as an example to describe in detail a structure of the keyboard 1 in this embodiment of this application. A structure of the keyboard 1 applied to another electronic device 4 may be designed with reference to the keyboard 1 of the notebook computer, and falls within the protection scope of this application.

Figure 3:
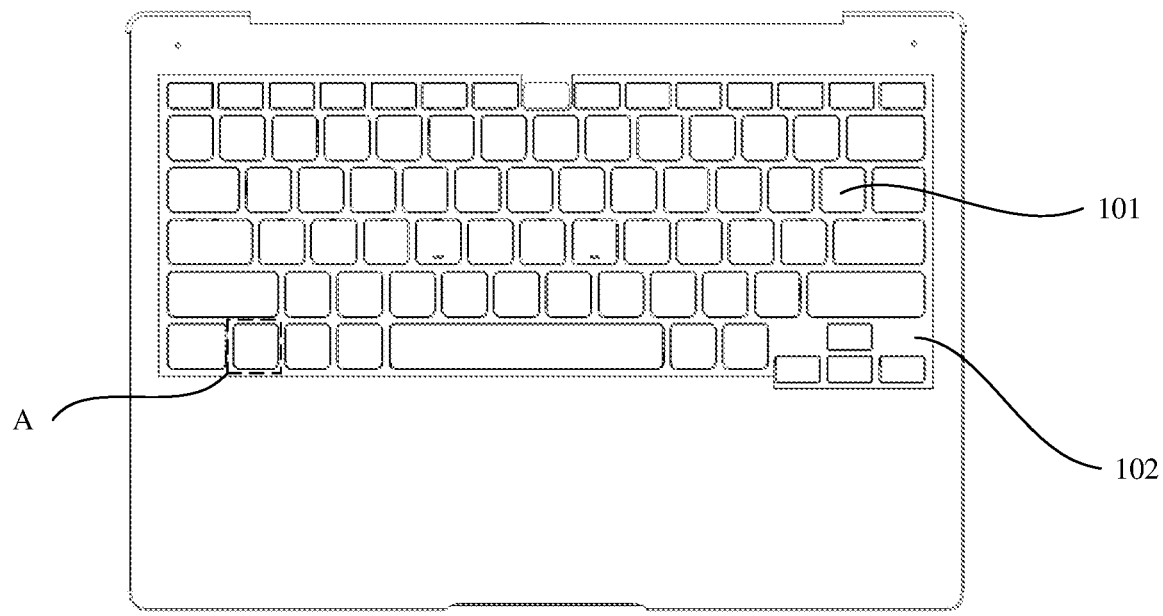
FIG. 3 is a schematic diagram of a structure of a keyboard according to an embodiment of this application.
Figure 4:
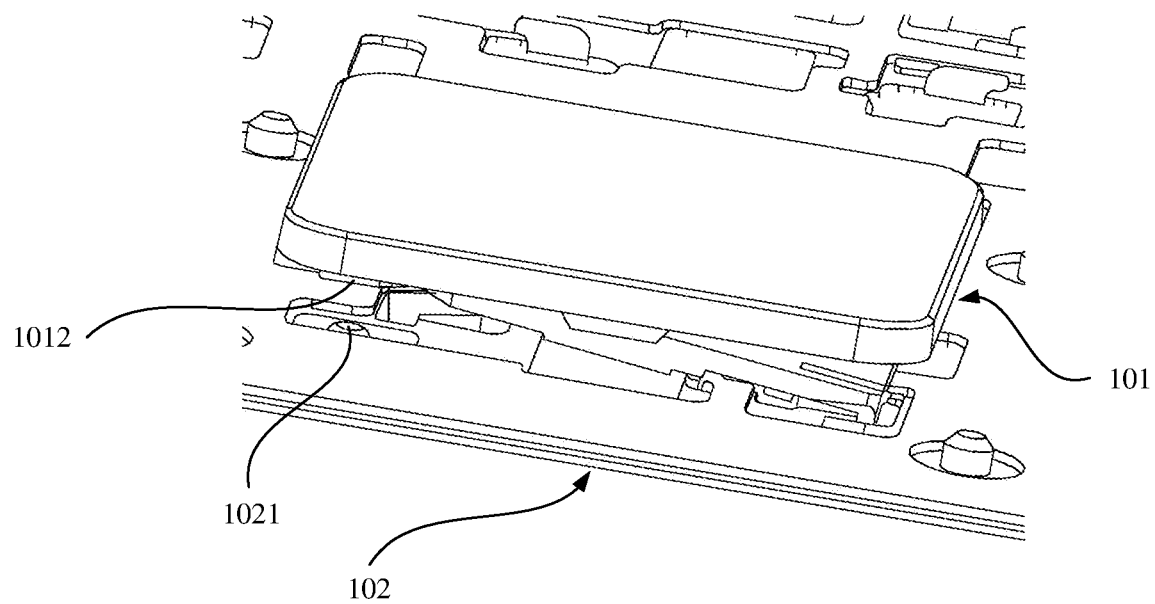
FIG. 4 is a schematic diagram of a partial structure of a position A in FIG. 3.

For specific disposing of the keyboard 1 in this embodiment of this application, refer to FIG. 3. The keyboard 1 in this embodiment of this application may include a base plate 102 and a plurality of keys 101 disposed on the base plate 102. The base plate 102 may support the plurality of keys 101. Refer to FIG. 3 and FIG. 4 together. FIG. 4 is a partial enlarged view of a structure of a single key position A of the keyboard 1 shown in FIG. 3. A protrusion 1012 is disposed on a side that is of the key 101 and that faces the base plate 102. The protrusion protrudes from the key 101 in a direction toward the base plate 102. A buffer structure 1021 is disposed on the base plate 102. In a movement direction of the key 101, at least a part of the protrusion 1012 of the key 101 is disposed opposite to at least a part of the buffer structure 1021. In this way, as shown in FIG. 4, when the key 101 is pressed, the protrusion on the key 101 may be in press contact with the buffer structure 1021, so that the buffer structure 1021 buffers the key 101, and a user feels less fatigue when tapping the keyboard 1. This improves user experience.

Figure 5:
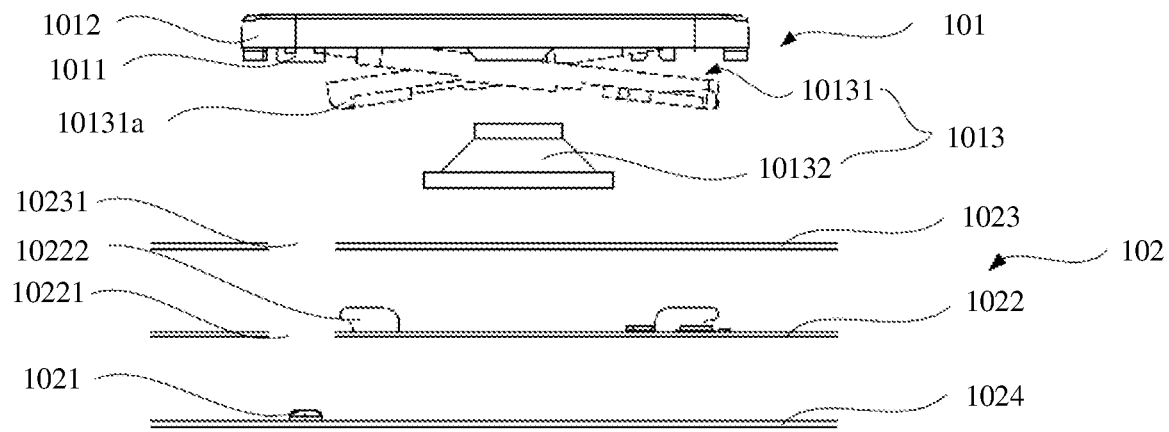
FIG. 5 is a schematic diagram of a structure of a single key position of a keyboard according to an embodiment of this application.

Refer to FIG. 5. In this embodiment of this application, when the key 101 is specifically disposed, the key 101 may include a keycap 1012 and a lifting assembly 1013. The keycap 1012 is configured to provide a pressed surface that bears pressing force. The lifting assembly 1013 is disposed between the keycap 1012 and the base plate 102. When no force is exerted on the key 101, a distance between the keycap 1012 and the base plate 102 is maximum. When the key 101 moves toward the base plate 102 and decelerates to zero, a distance between the keycap 1012 and the base plate 102 is minimum. In addition, when the distance between the keycap 1012 and the base plate 102 is maximum, the lifting assembly 1013 is in an unfolded state. When the distance between the keycap 1012 and the base plate 102 is minimum, the lifting assembly 1013 is in a folded state. In this embodiment of this application, the lifting assembly 1013 may be configured to drive the keycap 1012 to reciprocate in a direction toward the base plate 102 or away from the base plate 102. The lifting assembly 1013 may provide driving force for the keycap 1012 to move in a direction away from the base plate 102, and also provide support force for the keycap 1012 at a maximum distance from the base plate 102.

In some embodiments of this application, the lifting assembly 1013 of the key 101 may include a support 10131. The support 10131 may be but is not limited to a scissor leg type support, a butterfly type support, or the like. The scissor leg type support 10131 includes a plurality of support parts 1031a arranged in an X-shaped cross manner. Each support part 10131a may rotate around a support point of the support part 10131a. It may be understood that when the distance between the keycap 1012 and the base plate 102 is maximum, the plurality of support parts 10131a are in an unfolded state, to support the keycap 1012. When the distance between the keycap 1012 and the base plate 102 is minimum, the plurality of support parts 1031a are in a folded state.

In addition, the support points of the plurality of support parts 1031a for the keycap 1012 may be generally located at four corners of the keycap 1012, so that the key 101 has a stable movement characteristic. A user can press the key 101 with fixed pressure at any point on the keycap 1012, uneven pressure can be avoided, and the key does not get stuck. Therefore, currently the keyboard 1 mostly uses a scissor leg type key 101. For ease of understanding, in the following embodiments of this application, a structure of the key 101 is also described in detail by using a currently commonly used scissor leg type key 101 as an example.

Still refer to FIG. 5. In some embodiments of this application, to fasten the support 10131 and the keycap 1012, a chute (not shown in the figure) may be disposed on a side that is of the keycap 1012 and that faces the membrane 1023. In this way, one end of the support part 10131a of the support 10131 may extend into the chute, so that the support part 10131a may slide in the chute. In addition, a sliding block (not shown in the figure) may be further disposed at an end of the support part 10131a. The sliding block is clamped in the chute of the keycap 1012, to avoid that the support 10131 is disengaged from the keycap 1012. It may be understood that when the keycap 1012 moves toward or away from the base plate 102, an included angle between the support part 10131a of the support 10131 and the keycap 1012 keeps changing. Therefore, in some other embodiments of this application, the support part 10131a of the support 10131 may further rotate around a support point of the support part 10131a for the keycap 1012.

In this embodiment of this application, to implement a reciprocal movement of the keycap 1012 of the key 101 in a direction toward or away from the base plate 102, as shown in FIG. 5, in addition to the support 10131, the lifting assembly 1013 of the key 101 may further include a rebound structure 10132. The rebound structure 10132 is disposed between the keycap 1012 and the membrane 1023. Two ends of the rebound structure 10132 separately abut against the keycap 1012 and the membrane 1023. When the distance between the keycap 1012 and the base plate 102 is maximum, due to a light weight of the keycap 1012, the rebound structure 10132 slightly deforms, to provide elastic support force for the unpressed keycap 1012. When the keycap 1012 moves toward the base plate 102, the rebound structure 10132 is pressed to elastically deform, and accumulates elastic force, to provide driving force for the keycap 1012 to move in a direction away from the base plate 102.

A material of the rebound structure 10132 may be but is not limited to a rubber material. In this case, the rebound structure 10132 may be made of rubber through injection molding and in a circular truncated cone shape with a hollow structure. The rebound structure 10132 with this structure can provide elastic support force for the keycap 1012 to keep a maximum distance from the base plate 102, and can also allow the user to easily press the key 101. It may be understood that the foregoing embodiment is merely an example for describing the rebound structure 10132. In some other embodiments of this application, the rebound structure 10132 may alternatively be a spring, a dome, or the like.

In addition, still refer to FIG. 5. In this embodiment of this application, the protrusion 1011 on the key 101 may be disposed on the keycap 1012 or disposed on the lifting assembly 1013. When the protrusion 1011 is disposed on the keycap 1012, the protrusion 1011 may be a part of an original structure of the keycap 1012, to effectively simplify a structure of the key 101 and reduce costs of redesigning a mold of the keycap 1012. In addition, the protrusion 1011 is disposed on the keycap 1012. When the user presses the keycap 1012 by a finger, buffer force borne by the protrusion 1011 may be directly fed back to the finger of the user, and rebound force is provided for the finger of the user, so that the user feels less fatigue when tapping the key 101.

In some other embodiments of this application, the protrusion 1011 on the key 101 may alternatively be an independent structure disposed on the keycap 1012 through injection molding, bonding, or the like, so that the protrusion 1011 can be flexibly disposed.

When the protrusion 1011 is disposed on the lifting assembly 1013, the protrusion 1011 may be specifically disposed on the support 10131 of the lifting assembly 1013. In this embodiment, a specific disposing position of the protrusion 1011 on the support 10131 is not limited. For example, the protrusion 1011 may be disposed at a position that is of the support part 10131a and that is close to the support point of the support part 10131a for the keycap 1012. When the key 101 is pressed, the support part 10131a rotates around the support point of the support part 10131a for the keycap 1012, so that component force of the buffer force borne by the protrusion 1011 is transferred to the keycap 1012 through the support point. In this embodiment, the protrusion 1011 is disposed close to the support point, so that most of the buffer force borne by the protrusion 1011 may be fed back to the finger of the user through the support point, and rebound force is provided for the finger of the user, so that the user feels less fatigue when tapping the key 101.

Still refer to FIG. 5. When the base plate 102 is specifically disposed, the base plate 102 may include but is not limited to a back support plate 1022, a membrane 1023, and a backlight plate 1024. The membrane 1023 and the backlight plate 1024 are disposed on two sides of the back support plate 1022. The key 101 is disposed on a side that is of the membrane 1023 and that is away from the back support plate 1022. The back support plate 1022 may be but is not limited to a rigid metal plate such as a steel plate, to support the membrane 1023, the backlight plate 1024, and the key 101. In addition, a hook 10222 may be further disposed on the back support plate 1022. In this case, an end that is of the support 10131 of the key 101 and that is close to the base plate 102 can fit the hook 10222, so that the support 10131 is rotatable around the hook 10222.

A switch circuit is disposed on the membrane 1023. When being pressed, the key 101 may connect terminals that are originally in an open-circuit state and that are in the switch circuit of the membrane 1023, to implement an input function corresponding to the key 101.

In this embodiment of this application, light emitted by the backlight plate 1024 may sequentially pass through light transmission holes of the back support plate 1022 and the membrane 1023, to implement light emitting effect of the keyboard 1, so that a letter on the key 101 can be clearly seen when the light is not turned on at night. In addition, in this embodiment of this application, the backlight plate 1024 may be of a multi-membrane layer structure. The multi-membrane layer structure may, but not limited to, be formed by stacking a plurality of flexible membrane layers. The flexible membrane may include one or more organic materials, for example, polyethylene terephthalate (polyethylene terephthalate, PET).

Refer to FIG. 5. In this embodiment of this application, when the buffer structure 1021 is specifically disposed, the buffer structure 1021 may be disposed on a surface of a side that is of the backlight plate 1024 and that faces the back support plate 1022, and the buffer structure 1021 protrudes from the surface of the backlight plate 1024 in a direction toward the key 101. In addition, the buffer structure 1021 may be but is not limited to a rigid structure protrusion formed on the surface of the backlight plate 1024. For example, the rigid structure protrusion may be an ink spot or a plastic material protrusion. Still refer to FIG. 5. The back support plate 1022 is provided with a first through hole 10221. The membrane 1023 is provided with a second through hole 10231. In a direction from the membrane to the backlight plate, a projection of a first buffer structure falls within a projection boundary range of the first through hole, and falls within a projection boundary range of the second through hole. In this way, the first through hole 10221 and the second through hole 10231 may be used to avoid the buffer structure 1021.

Figure 6:
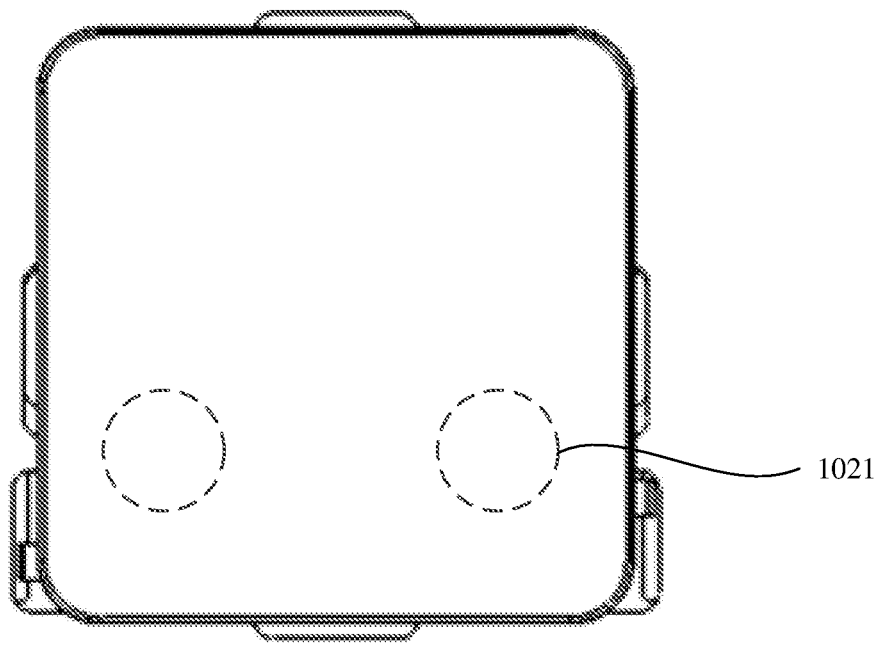
FIG. 6 is a schematic diagram of a structure of a single key position of a keyboard according to another embodiment of this application.
Figure 7:
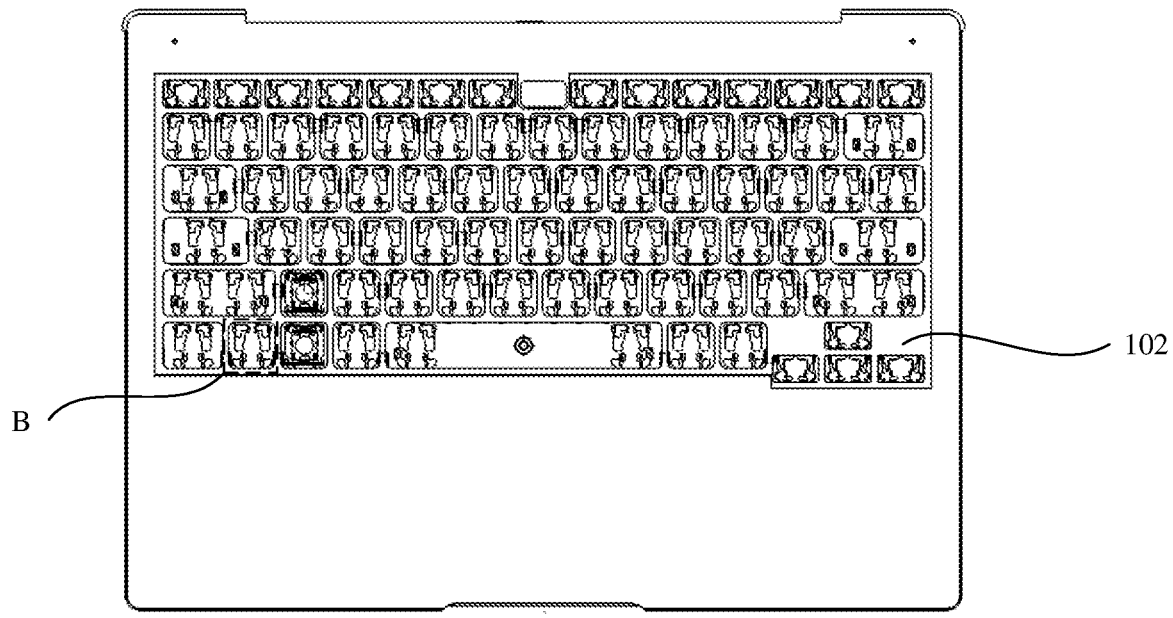
FIG. 7 is a schematic diagram of a structure of a keyboard according to another embodiment of this application.
Figure 8:
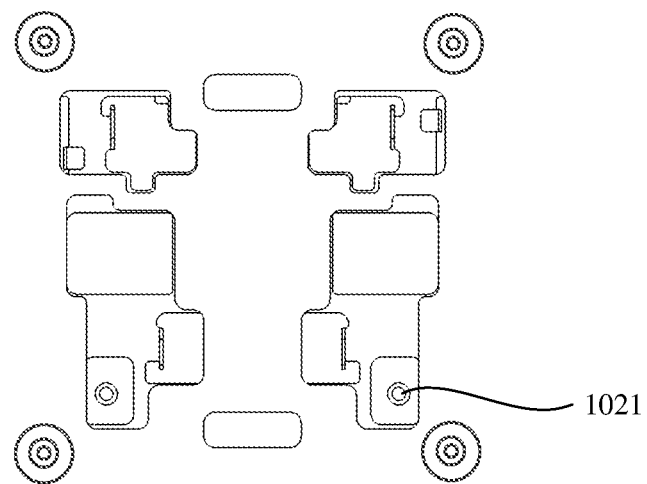
FIG. 8 is a schematic diagram of a structure of a single key position of a keyboard according to another embodiment of this application.
Figure 9:
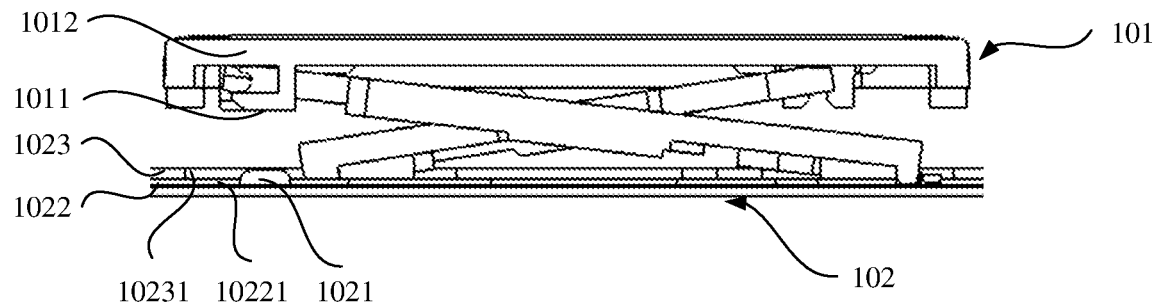
FIG. 9 is a schematic diagram of a structure of a single key position of a keyboard according to another embodiment of this application.

FIG. 6 is a top view of a key 101 of the keyboard 1 according to an embodiment of this application. A circle represented by a dashed line in the figure is a disposing position of the buffer structure 1021. FIG. 7 is a schematic diagram of a structure of the keyboard 1 according to an embodiment of this application. The key 101 is omitted in FIG. 7, to facilitate understanding of a structure of the base plate 102. FIG. 8 is a top view of the base plate 102 at a position corresponding to the key 101 in FIG. 6. In the embodiments shown in FIG. 6 and FIG. 8, there may be at least two buffer structures 1021, for example, the first buffer structure and a second buffer structure. In a projection range that is of the key 101 and that is on the base plate 102, the at least two buffer structures 1021 may be disposed in a middle area. The at least two buffer structures 1021 are disposed, so that multi-point contact between the buffer structures 1021 and the key 101 can be implemented, and the key 101 more stably continues moving after the key 101 comes into contact with the buffer structures 1021. This helps improve user experience. FIG. 9 is a schematic diagram of an assembly structure of the key 101 and the base plate 102 of the keyboard 1 according to an embodiment of this application. In the embodiment shown in FIG. 9, the buffer structure 1021 is disposed at an end of the projection that is of the key 101 and that is on the base plate 102. The protrusion 1011 on the key 101 may be, for example, disposed on the keycap 1012. The buffer structure 1021 sequentially extends into the first through hole 10221 of the back support plate 1022 and the second through hole 10231 of the membrane 1023. In addition, a height of the buffer structure 1021 higher than a surface of the backlight plate 1024 may be less than or equal to a sum of thicknesses of the back support plate 1022 and the membrane 1023. This improves surface flatness of the base plate 102. In some other embodiments, a height of the buffer structure 1021 higher than a surface of the backlight plate 1024 may alternatively be less than or equal to a sum of thicknesses of the back support plate 1022 and the membrane 1023, so that the buffer structure 1021 can provide large buffer force for the key 101.

Figure 10:
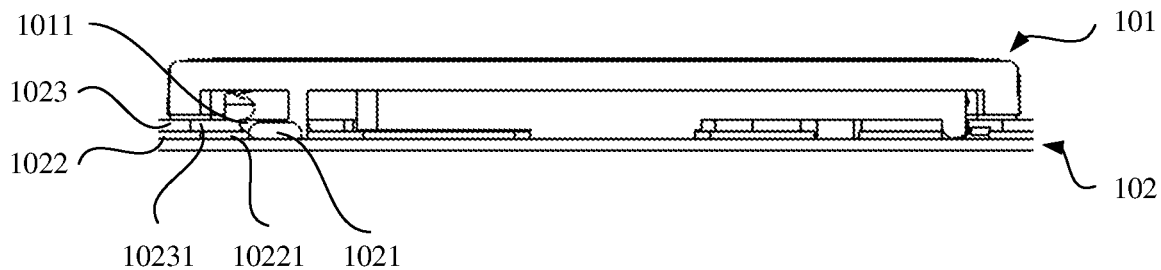
FIG. 10 is a schematic diagram of a structure of a single key position of a keyboard according to another embodiment of this application.

For the keyboard 1 in this embodiment of this application, refer to FIG. 9. When the keycap 1012 at a maximum distance from the base plate 102 bears pressing force, the key 101 moves toward the base plate 102. When the key 101 is at a location shown in FIG. 10, the distance between the keycap 1012 and the base plate 102 is minimum, the protrusion 1011 on the key 101 passes through the second through hole 10231 in the membrane 1023 and the first through hole 10221 in the back support plate 1022 to come into contact with the buffer structure 1021 disposed on the backlight plate 1024, and starts to decelerate to zero. In this embodiment of this application, the first through hole 10221 in the back support plate 1022 is only used to avoid the protrusion 1011 on the key 101. Therefore, the first through hole 10221 may be small, so that the back support plate 1022 has reliable structural stability, and structural stability of the keyboard 1 is higher. In addition, the backlight plate 1024 is formed by stacking the flexible membrane layers, and the buffer structure 1021 is disposed on the backlight plate 1024, so that the backlight plate 1024 can deform to effectively buffer the key 101.

Figure 11:
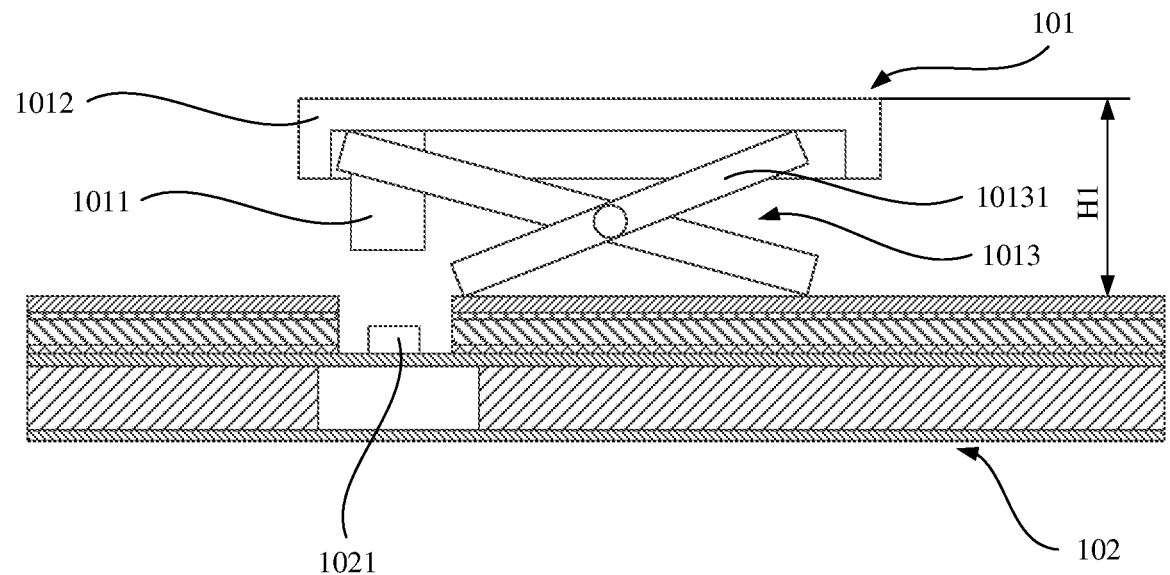
FIG. 11 is a schematic diagram of a structure of a single key position of a keyboard according to another embodiment of this application.
Figure 12:
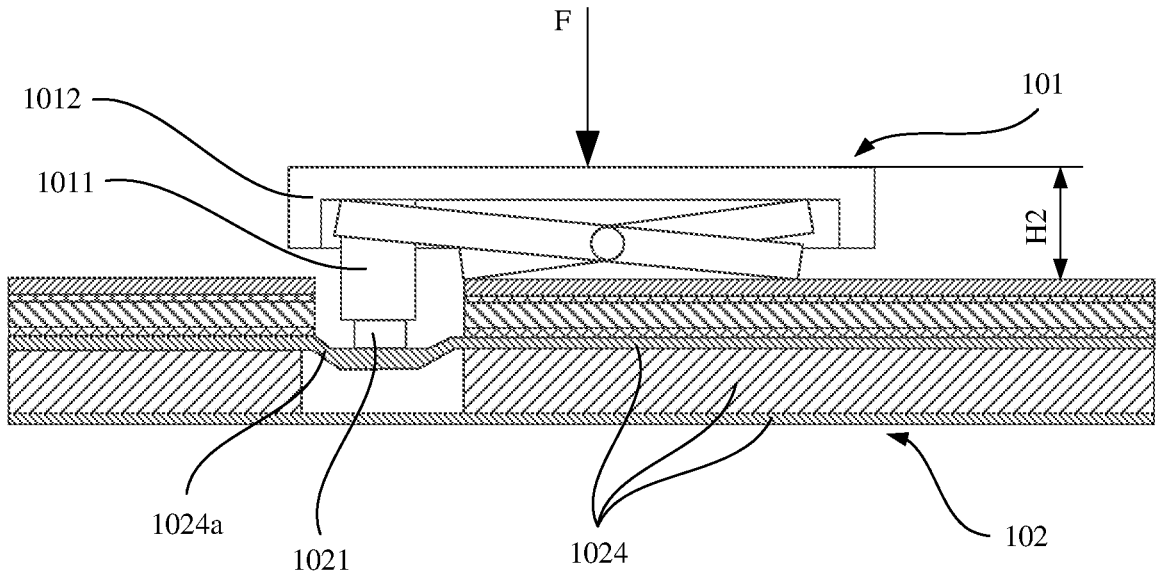
FIG. 12 is a schematic diagram of a structure of a single key position of a keyboard according to another embodiment of this application.
Figure 13:
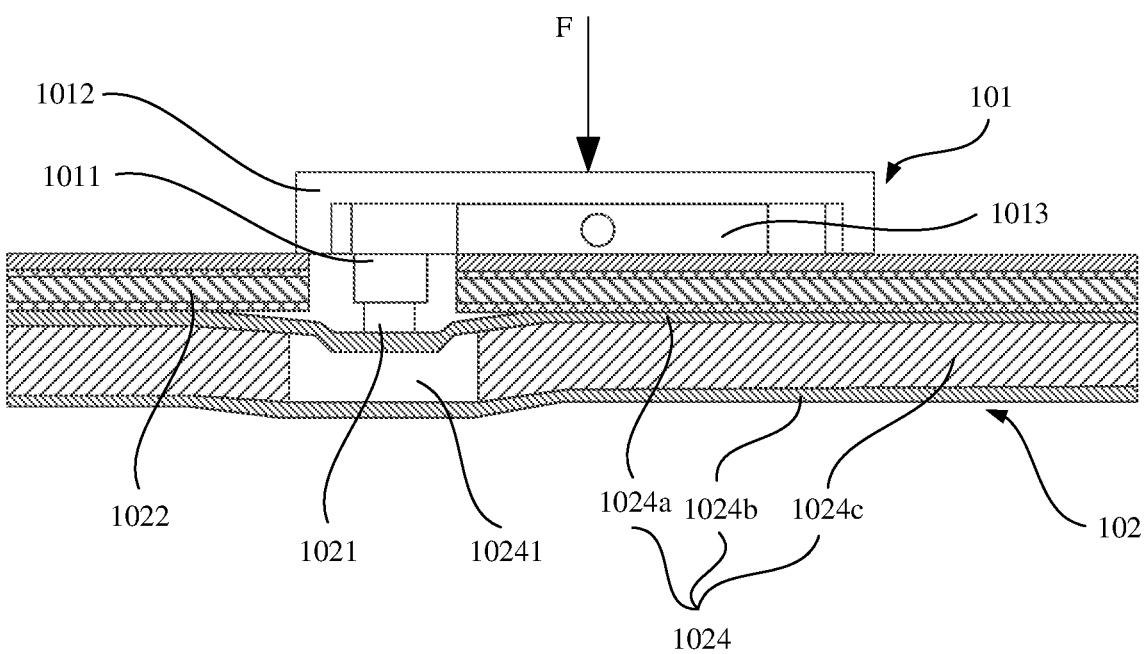
FIG. 13 is a schematic diagram of a structure of a single key position of a keyboard according to another embodiment of this application.

The following describes a process in which the key 101 of the keyboard 1 in this embodiment of this application lands on the base plate 102 when being tapped, with reference to FIG. 11 to FIG. 13 by using an example in which the protrusion 1011 on the key 101 is disposed on the keycap 1012, and the key 101 is a scissor leg type key 101.

FIG. 11 is a schematic diagram of a structure of a single key position of the keyboard 1. In this case, a distance H1 between the keycap 1012 and the base plate 102 is maximum, and the support 1013 is in an unfolded state, to support the keycap 1012. The base plate 102 supports the key 101.

Then, as shown in FIG. 12, pressing force F is exerted on any position of the keycap 1012 of the key 101. The key 101 moves toward the base plate 102 under the pressing force F. When a distance between the keycap 1012 of the key 101 and the base plate 102 is H2, the protrusion 1011 on the key 101 is in contact with the buffer structure 1021. Because both the protrusion 1011 on the key 101 and the buffer structure 1021 are rigid structures, when the protrusion 1011 is in contact with the buffer structure 1021, the key 101 decelerates under rigid impact of the buffer structure 1021. In addition, a layer structure 1024a that is of the backlight plate 1024 and that is in direct contact with the buffer structure 1021 deforms, to reduce the rigid impact and buffer the key 101. It may be understood that, in this process, the finger that exerts the pressing force F bears very small rigid impact.

Finally, the key 101 decelerates to zero. As shown in FIG. 13, in this case, the distance between the keycap 1012 and the base plate 102 is minimum (which may be close to 0), and the support 1013 is in a folded state. A part that is of each layer structure of the backlight plate 1024 and that is located on a periphery of the buffer structure 1021 is deformed to an extent, so that the backlight plate 1024 can more effectively buffer the key 101.

In addition, refer to FIG. 12 and FIG. 13 together. In some embodiments of this application, to further better buffer the key 101, a cavity structure 10241 may be further disposed in the backlight plate 1024. In a stacking direction of the backlight plate 1024, a projection of the buffer structure 1021 may fall within a projection boundary range of the cavity structure 10241. In addition, a projection area of the cavity structure 10241 may be further greater than an area of the projection of the buffer structure 1021 on the backlight plate 1024, to increase deformation of the backlight plate 1024 and better buffer the key 101.

When the cavity structure 10241 is specifically disposed, as shown in FIG. 13, a part or all of other layer structures 1024c of the backlight plate 1024 between the layer structure 1024a for disposing the buffer structure 1021 and a layer structure 1024b farthest from the buffer structure 1021 (the layer structure 1024a is located on a side that is of the layer structure 1024b and that is close to the key 101) may be removed to form the cavity structure 10241. The cavity structure 10241 may be a through hole disposed in the backlight plate 1024, or may be a blind hole. This is not specifically limited in this application.

As shown in FIG. 13, for the keyboard 1 in this embodiment of this application, when the key 101 is pressed to the bottommost end, although the backlight plate 1024 greatly deforms, the back support plate 1022 slightly or scarcely deforms. Therefore, in this embodiment of this application, structural stability of the base plate 102 of the keyboard 1 is higher, so that structural stability of the entire keyboard 1 can be effectively improved.

Figure 14:
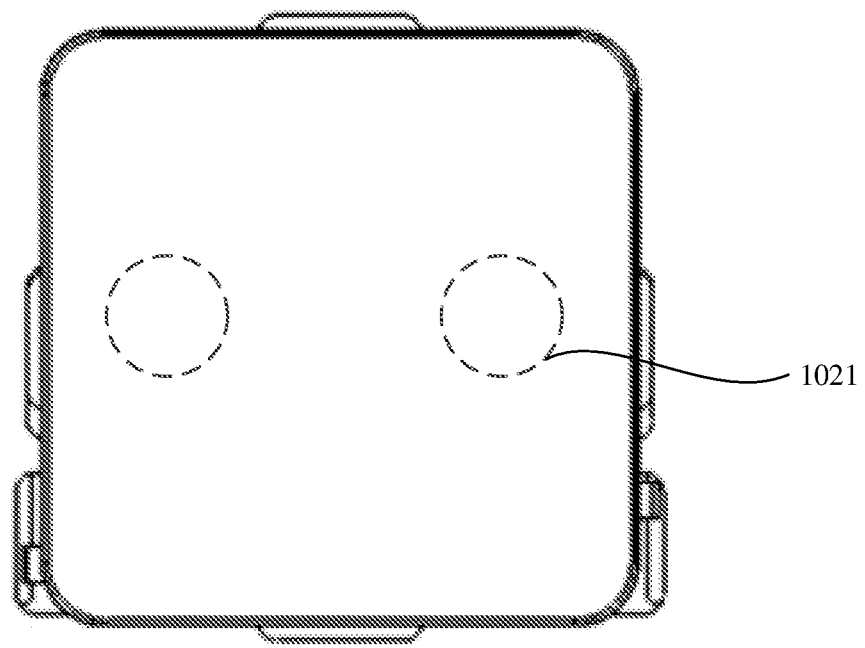
FIG. 14 is a schematic diagram of a structure of a single key position of a keyboard according to another embodiment of this application.
Figure 15:
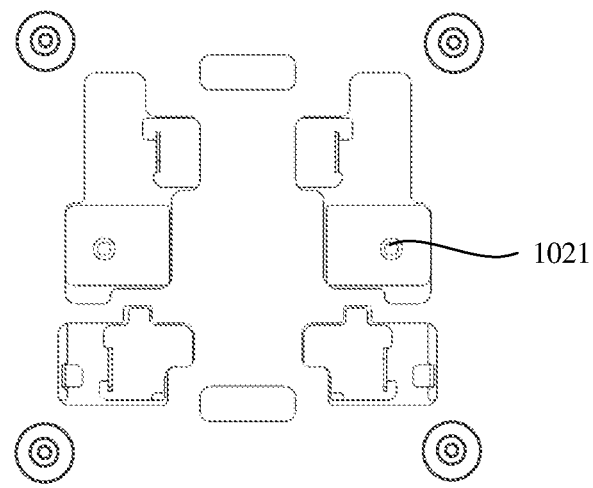
FIG. 15 is a schematic diagram of a structure of a single key position of a keyboard according to another embodiment of this application.

In some other embodiments of this application, refer to FIG. 14 and FIG. 15 together. In this embodiment, the buffer structure 1021 may alternatively be disposed at a position corresponding to the middle area of the key 101. In addition, in this embodiment, there may alternatively be at least two buffer structures 1021, so that the key 101 more stably moves.

Figure 16:
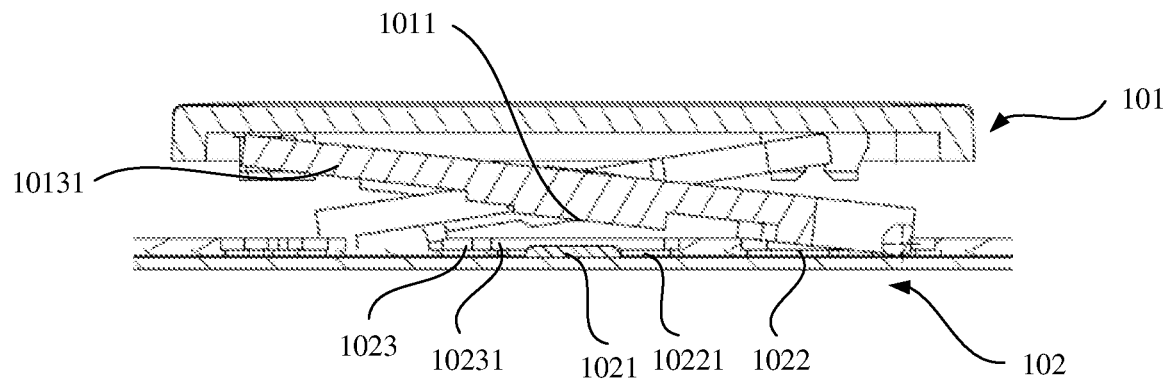
FIG. 16 is a schematic diagram of a structure of a single key position of a keyboard according to another embodiment of this application.

When the buffer structure 1021 is disposed at the position corresponding to the middle area of the key 101, refer to FIG. 16. FIG. 16 is a schematic diagram of an assembly structure of a key 101 and a base plate 102 of a keyboard 1 according to another embodiment of this application. The protrusion 1011 on the key 101 may, but not limited to, be disposed on the support 10131. In this embodiment, the protrusion 1011 may be an independent structure, or may be a part of an original structure of the support 10131. The buffer structure 1021 may sequentially extend into the first through hole 10221 of the back support plate 1022 and the second through hole 10231 of the membrane 1023. In addition, a height of the buffer structure 1021 higher than a surface of the backlight plate 1024 may alternatively be greater than or equal to a sum of thicknesses of the back support plate 1022 and the membrane 1023, so that the buffer structure 1021 can provide large buffer force for the key 101. In some other embodiments, a height of the buffer structure 1021 higher than a surface of the backlight plate 1024 may be less than or equal to a sum of thicknesses of the back support plate 1022 and the membrane 1023. This improves surface flatness of the base plate 102.

Figure 17:
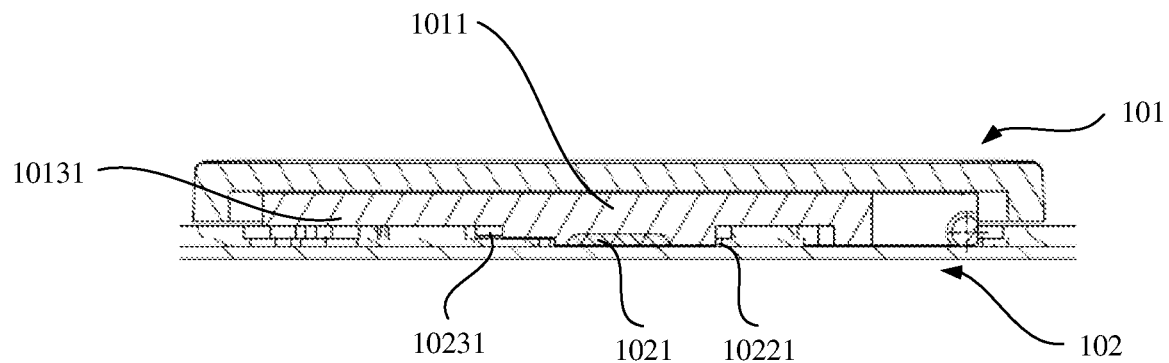
FIG. 17 is a schematic diagram of a structure of a single key position of a keyboard according to another embodiment of this application.

For the keyboard 1 in this embodiment of this application, refer to FIG. 16. When the keycap 1012 at a maximum distance from the base plate 102 bears pressing force, the key 101 moves toward the base plate 102. When the key 101 is at a location shown in FIG. 17, the distance between the keycap 1012 and the base plate 102 is minimum, the protrusion 1011 on the key 101 passes through the second through hole 10231 in the membrane 1023 and the first through hole 10221 in the back support plate 1022 to come into contact with the buffer structure 1021 disposed on the backlight plate 1024, and starts to decelerate to zero. In this embodiment of this application, the first through hole 10221 in the back support plate 1022 is only used to avoid the protrusion 1011 on the key 101. Therefore, the first through hole 10221 may be small, so that the back support plate 1022 has reliable structural stability, and structural stability of the keyboard 1 is higher. In addition, the backlight plate 1024 is formed by stacking the flexible membrane layers, and the buffer structure 1021 is disposed on the backlight plate 1024, so that the backlight plate 1024 can deform to effectively buffer the key 101.

Figure 18:
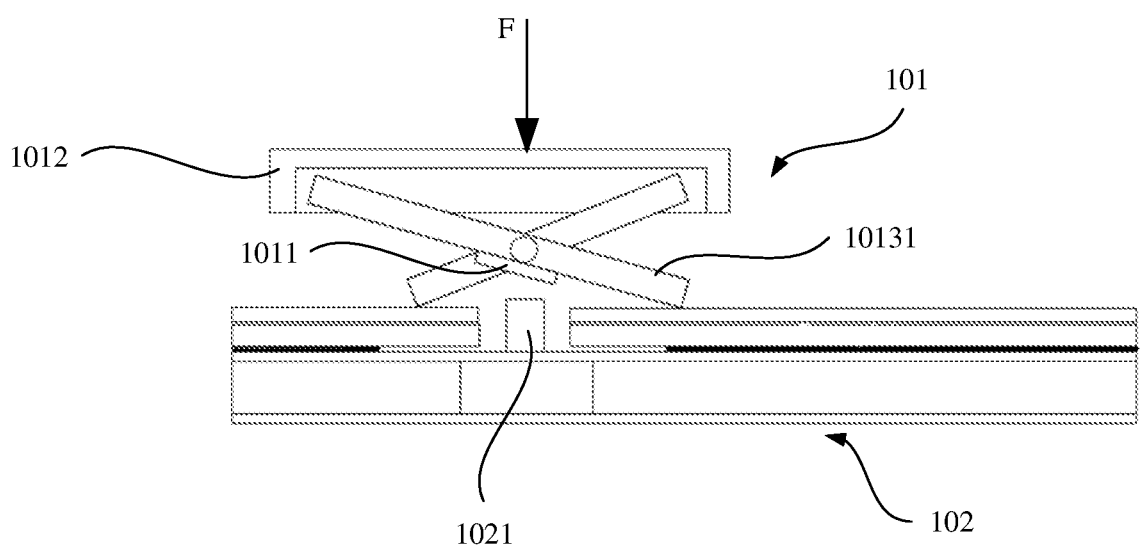
FIG. 18 is a schematic diagram of a structure of a single key position of a keyboard according to another embodiment of this application.
Figure 19:
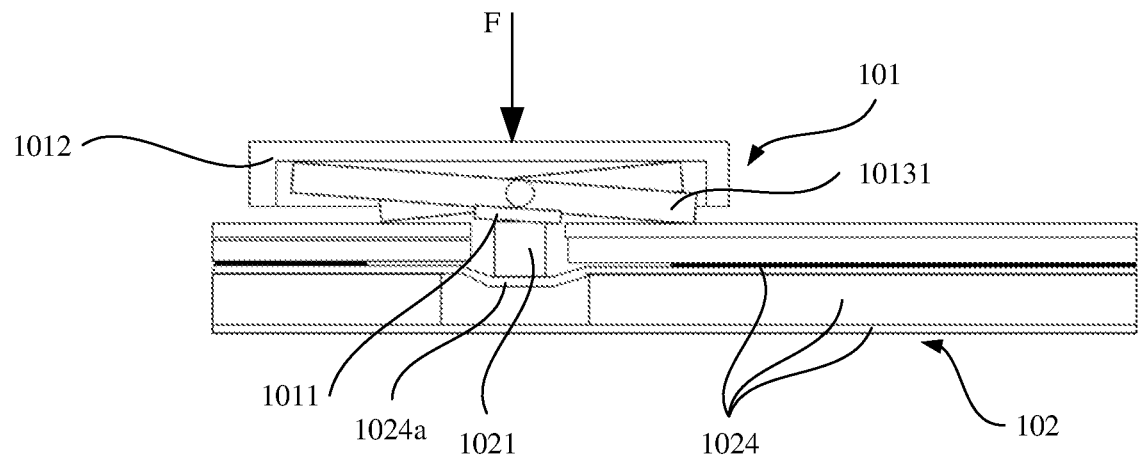
FIG. 19 is a schematic diagram of a structure of a single key position of a keyboard according to another embodiment of this application.
Figure 20:
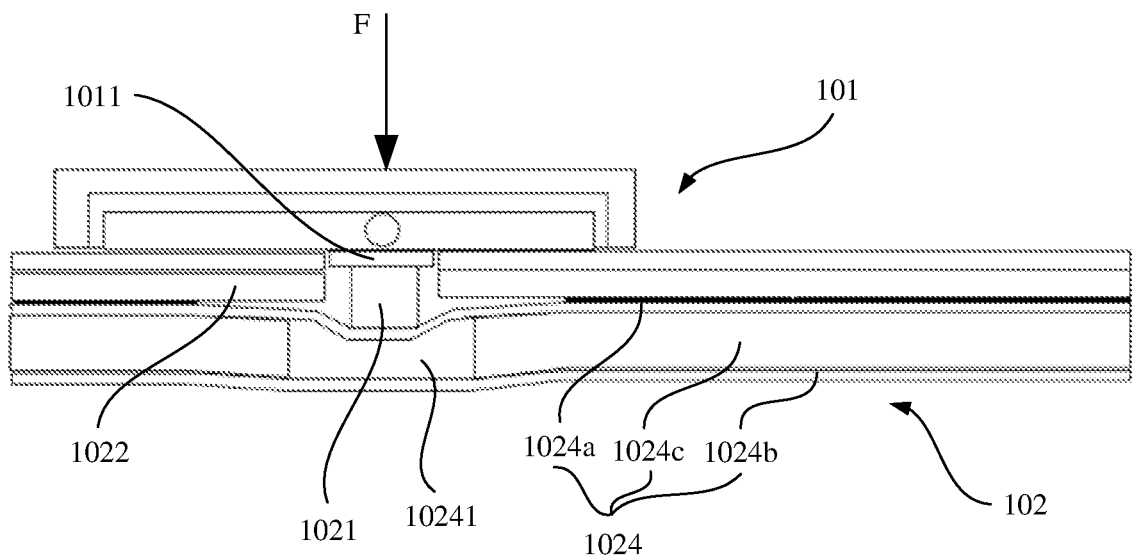
FIG. 20 is a schematic diagram of a structure of a single key position of a keyboard according to another embodiment of this application.

The following describes a process in which the key 101 of the keyboard 1 in this embodiment of this application lands on the base plate 102 when being tapped, with reference to FIG. 18 to FIG. 20 by using an example in which the protrusion 1011 on the key 101 is disposed on the support 10131, and the key 101 is a scissor leg type key 101.

FIG. 18 is a schematic diagram of a structure of a single key position of the keyboard 1. In this case, the distance between the keycap 1012 and the base plate 102 is maximum, and the support 1013 is in an unfolded state, to support the keycap 1012. The base plate 102 supports the key 101.

Then, as shown in FIG. 19, pressing force F is exerted on any position of the keycap 1012 of the key 101. The key 101 moves toward the base plate 102 under the pressing force F. The protrusion 1011 on the key 101 is in contact with the buffer structure 1021. Because both the protrusion 1011 on the key 101 and the buffer structure 1021 are rigid structures, when the protrusion 1011 is in contact with the buffer structure 1021, the key 101 decelerates under rigid impact of the buffer structure 1021. In addition, a layer structure 1024a that is of the backlight plate 1024 and that is in direct contact with the buffer structure 1021 deforms, to reduce the rigid impact and buffer the key 101. It may be understood that, in this process, the finger that exerts the pressing force F bears very small rigid impact.

Finally, the key 101 decelerates to zero. As shown in FIG. 20, in this case, the distance between the keycap 1012 and the base plate 102 is minimum (which may be close to 0), and the support 1013 is in a folded state. A part that is of each layer structure of the backlight plate 1024 and that is located on a periphery of the buffer structure 1021 is deformed to an extent, so that the backlight plate 1024 can more effectively buffer the key 101.

In this embodiment, a part or all of other layer structures 1024c of the backlight plate 1024 between the layer structure 1024a for disposing the buffer structure 1021 and a layer structure 1024b farthest from the buffer structure 1021 may be further removed to form the cavity structure 10241, to better buffer the key 101.

As shown in FIG. 20, for the keyboard 1 in this embodiment of this application, when the key 101 is pressed to the bottommost end, although the backlight plate 1024 greatly deforms, the back support plate 1022 slightly or scarcely deforms. Therefore, in this embodiment of this application, structural stability of the base plate 102 of the keyboard 1 is higher, so that structural stability of the entire keyboard 1 can be effectively improved.

It may be understood that the foregoing disposing positions of the buffer structure 1021 are merely some example descriptions provided in this embodiment of this application. In some possible embodiments of this application, the buffer structure 1021 may alternatively be disposed at another position in an area that is of the base plate 102 and that is used to dispose the key 101. For example, there are two buffer structures 1021, and the two buffer structures 1021 are separately disposed at positions corresponding to two vertices of a diagonal line of the key 101. For a specific disposing manner of the buffer structure, refer to the foregoing embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. An electronic device, comprising:
a display; and
a processor assembly comprising a circuit board and a keyboard, wherein the display is in signal connection with the keyboard through the circuit board;

wherein the keyboard comprises a base plate and keys disposed on the base plate, the base plate comprises a back support plate, a membrane, and a backlight plate, the membrane and the backlight plate are disposed on opposite sides of the back support plate, a first buffer structure is disposed on a surface of the backlight plate that faces the back support plate, the first buffer structure protrudes from the surface of the backlight plate in a direction that is toward a first key of the keys, a first through hole extends through the back support plate, a second through hole extends through the membrane, and in a direction that is from the membrane to the backlight plate, a projection of the first buffer structure falls within a projection boundary range of the first through hole, and falls within a boundary range of the second through hole; and wherein the keys are disposed on a side of the membrane that faces away from the back support plate, a first protrusion protrudes from the first key in a direction that is toward the base plate, and the keyboard is configured in a manner that when the key moves toward the base plate, the first protrusion comes into press contact with the first buffer structure.

2. The electronic device according to claim 1, wherein the first buffer structure is a rigid structure protrusion.

3. The electronic device according to claim 1, wherein the first buffer structure comprises ink or plastic.

4. The electronic device according to claim 1, wherein a height of the first buffer structure above a surface of the backlight plate is greater than or equal to a sum of thicknesses of the back support plate and the membrane.

5. The electronic device according to claim 1, wherein a second protrusion extends from the first key, a second buffer structure is disposed on the backlight plate, the keyboard is further configured in a manner that when the first key moves toward the base plate the second protrusion comes into press contact with the second buffer structure.

6. The electronic device according to claim 1, wherein the backlight plate is a multi-membrane layer structure, the backlight plate comprises a first layer structure and a second layer structure, the first layer structure is located on a side of the second layer structure that faces the first key, and the first buffer structure is disposed on a surface of the first layer structure; and wherein a cavity structure is between the first layer structure and the second layer structure, and in a direction from the first layer structure to the second layer structure, the projection of the first buffer structure falls within a projection boundary range of the cavity structure.

7. The electronic device according to claim 6, wherein in the direction from the first layer structure to the second layer structure, a projection area of the cavity structure is greater than an area of the projection of the first buffer structure.

8. The electronic device according to claim 6, wherein the first key comprises a keycap and a lifting assembly, the lifting assembly is between the keycap and the base plate, and the lifting assembly is configured to drive the keycap to reciprocate in a direction toward or away from the base plate.

9. The electronic device according to claim 8, wherein the lifting assembly comprises a support and a rebound structure, the support comprises a plurality of support parts arranged in a cross manner, a chute is disposed on a side of the keycap that faces the membrane, a first end of the support part extends into the chute and is slidable along the chute, a hook is disposed on a side of the back support plate that faces the first key, and a second end of the support part fits the hook and is rotatable around the hook; and wherein the rebound structure is between the keycap and the base plate, and two ends of the rebound structure separately abut against the membrane and the keycap.

10. The electronic device according to claim 8, wherein:
the first protrusion is an independent structure disposed on the keycap; or
the first protrusion is a part of a structure of the keycap.

11. The electronic device according to claim 9, wherein:
the first protrusion is an independent structure disposed on the support; or
the first protrusion is a part of a structure of the support.

12. The electronic device according to claim 1, wherein the electronic device is a notebook computer.

13. The electronic device according to claim 12, wherein the processor assembly further comprises a touch panel, and the touch panel is in signal connection with the display through the circuit board.

14. A keyboard, comprising:
a base plate; and
keys disposed on the base plate;
wherein the base plate comprises a back support plate, a membrane, and a backlight plate, the membrane and the backlight plate are disposed on opposite sides of the back support plate, a first buffer structure is disposed on a surface of the backlight plate that faces the back support plate, the first buffer structure protrudes from the surface of the backlight plate in a direction that is toward a first key of the keys, a first through hole extends through the back support plate, a second through hole extends through the membrane, and in a direction from the membrane to the backlight plate, a projection of the first buffer structure falls within a projection boundary range of the first through hole, and falls within a boundary range of the second through hole; and wherein the first key is disposed on a side of the membrane that faces away from the back support plate, a first protrusion extends from the first key in a direction that is toward the base plate, the keyboard in configured in a manner that when the first key moves toward the base plate, and the first protrusion comes into press contact with the first buffer structure.

15. The keyboard according to claim 14, wherein the first buffer structure is a rigid structure protrusion.

16. The keyboard according to claim 14, wherein the first buffer structure comprises ink or plastic.

17. The keyboard according to claim 14, wherein a height of the first buffer structure above a surface of the backlight plate is greater than or equal to a sum of thicknesses of the back support plate and the membrane.

18. The keyboard according to claim 14, wherein the first key further comprises a second protrusion, the backlight plate is further provided with a second buffer structure, and the keyboard is further configured in a manner that when the first key moves toward the base plate, and the second protrusion comes into press contact with the second buffer structure.

19. The keyboard according to claim 18, wherein in a projection range that is of the key and that is on the base plate, the first buffer structure and the second buffer structure are located in a middle area, or located at an end, or located at two vertices of a diagonal line.

20. The keyboard according to claim 14, wherein the backlight plate is a multi-membrane layer structure, the backlight plate comprises a first layer structure and a second layer structure, the first layer structure is located on a side of the second layer structure that faces the first key, and the first buffer structure is disposed on a surface of the first layer structure; and wherein a cavity structure is disposed between the first layer structure and the second layer structure, and in a direction that is from the first layer structure to the second layer structure, the projection of the first buffer structure falls within a projection boundary range of the cavity structure.

\* \* \* \* \*